(12) United States Patent
Fredland et al.

(10) Patent No.: US 7,296,541 B2
(45) Date of Patent: Nov. 20, 2007

(54) SAFETY COLLAR SYSTEM

(75) Inventors: Richard Fredland, Pasadena, CA (US);
Noelle Fredland, Pasadena, CA (US);
Christopher Hillyer, Goleta, CA (US);
Bill Reimann, Salt Lake City, UT (US)

(73) Assignee: Richard Alan Fredland, Jr., Pasadena, CA (US)

( * ) Notice: Subject to any disclaimer, the term of this patent is extended or adjusted under 35 U.S.C. 154(b) by 0 days.

(21) Appl. No.: 11/425,740

(22) Filed: Jun. 22, 2006

(65) Prior Publication Data
US 2007/0074679 A1    Apr. 5, 2007

Related U.S. Application Data

(60) Provisional application No. 60/596,610, filed on Oct. 5, 2003.

(51) Int. Cl.
*A62B 35/00* (2006.01)
(52) U.S. Cl. ...................................... 119/858
(58) Field of Classification Search ........ 119/769–772, 119/774, 792, 795, 797, 798, 850, 863–865
See application file for complete search history.

(56) References Cited

U.S. PATENT DOCUMENTS

| | | | | |
|---|---|---|---|---|
| 3,995,598 A * | 12/1976 | Gardner et al. | ............. | 119/864 |
| 4,426,957 A * | 1/1984 | Horrigan | ..................... | 119/865 |
| 4,811,695 A * | 3/1989 | Higgins | ....................... | 119/864 |
| 4,924,815 A * | 5/1990 | Halla | .......................... | 119/864 |
| 5,785,010 A * | 7/1998 | Koch | .......................... | 119/863 |
| 6,213,057 B1 * | 4/2001 | Franco et al. | ................ | 119/793 |
| 6,899,060 B1 * | 5/2005 | Yen | ............................. | 119/863 |
| 7,051,682 B2 * | 5/2006 | Clute et al. | ................ | 119/864 |
| 7,117,659 B1 * | 10/2006 | Grogoza | ..................... | 54/79.4 |
| 7,165,511 B1 * | 1/2007 | Brezinski | .................... | 119/792 |

* cited by examiner

*Primary Examiner*—Thomas Price
(74) *Attorney, Agent, or Firm*—Trent H. Baker; Baker & Associates PLLC

(57) ABSTRACT

The present invention relates to an animal safety collar and methods of operation. One embodiment of the present invention relates to an animal safety collar including a strip of flexible material, an extendable material, a first coupling device, and a second coupling device. The extendable material is coupled to either end of the strip of flexible material so as to form a loop. The loop's circumference may be temporarily increased by expanding the extendable material, causing the ends of the flexible material to move away from one another. This capability allows the collar to expand so the animal can slide out of the collar when it is inadvertently coupled to a fixed object in an unsupervised scenario. The first and second coupling devices are fixably coupled to the ends of the strip of flexible material, respectively. Therefore, when the extendable material is expanded, the first and second coupling device move away from one another. The expanding capability may be disabled by rigidly coupling a device simultaneously to the first and second couplers, thereby preventing them from moving away from one another. Therefore, the expandable safety feature may be disabled when an animal is in a supervised scenario such as a walk.

20 Claims, 3 Drawing Sheets

SAFETY COLLAR SYSTEM

RELATED APPLICATIONS

This application claims priority to U.S. provisional application Ser. No. 60/596,610 filed Oct. 5, 2005.

FIELD OF THE INVENTION

The invention generally relates to animal restraining and identification systems. In particular, the present invention relates to an animal safety collar and methods of operation.

BACKGROUND OF THE INVENTION

Animal collars are used to restrain and identify domesticated animals. For example, dog collars generally include a tag with identification and vaccination information as well as a loop for attaching a leash. A leash is commonly attached to a collar when an animal is removed from a confined area. For example, when an owner takes their domesticated dog for a walk they generally attach a collar to prevent the dog from exhibiting bad behavior and/or escaping. Collars are positioned around an animals' neck between their shoulders and their head. The neck is utilized for collar placement because of its relatively narrow diameter with respect to the shoulders and head. Various attachment systems are used to secure the collar around an animal's neck such as clasps, buckles, etc. Likewise, collars are made of various materials including leather, nylon, plastic, metal, etc.

Conventional collars are composed of one or more static materials that are configured for one or more static diameters to accommodate the particular neck diameter of an animal. The static or fixed diameter property of a collar is necessary to prevent an animal from sliding out of the collar when it is attached to a leash or when it is restrained. For example, if a dog commonly pulls away from the owner during a walk, it is necessary for the collar to be rigid to prevent the dog from slipping out of the collar. A collar may also be used to constrain an animal to a particular fixed location via a long leash, cord, or rope. In this scenario, it is also necessary to prevent the animal from sliding out of the collar when it pulls against the leash, cord, or rope.

However, the fixed or static collar property also poses significant safety risks for an animal when it is not coupled to a leash or other containment system. It is possible for the collar to become hooked or entangled in an object. Since the collar is positioned around an animals' neck, the entanglement or hooking of the collar may compress the larynx of the animal, causing asphyxiation. Alternatively, the entanglement may cause extreme discomfort to the animal for an extended period of time. In addition, the static diameter properties of a collar may injure or hurt a second animal that inadvertently becomes entangled in the first animal's collar. For example, dogs often physically play or fight with one another by biting at neck region of one another. If during this activity, one of the dogs becomes entangled in the others collar, they are likely to pull away from one another possibly causing damage or discomfort.

Therefore, there is a need in the industry for an animal collar that overcomes the problems above while maintaining the features of conventional collars.

SUMMARY OF THE INVENTION

The present invention relates to an animal safety collar and methods of operation. One embodiment of the present invention relates to an animal safety collar including a strip of flexible material, an extendable material, a first coupling device, and a second coupling device. The extendable material is coupled to either end of the strip of flexible material so as to form a loop. The loop's circumference may be temporarily increased by expanding the extendable material, causing the ends of the flexible material to move away from one another. This capability allows the collar to expand so the animal can slide out of the collar when it is inadvertently coupled to a fixed object in an unsupervised scenario. The first and second coupling devices are fixably coupled to the ends of the strip of flexible material, respectively. Therefore, when the extendable material is expanded, the first and second coupling device move away from one another. The expanding capability may be disabled by rigidly coupling a device simultaneously to the first and second couplers, thereby preventing them from moving away from one another. Therefore, the expandable safety feature may be disabled when an animal is in a supervised scenario such as a walk.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

The present invention relates to an animal safety collar and methods of operation. One embodiment of the present invention relates to an animal safety collar including a strip of flexible material, an extendable material, a first coupling device, and a second coupling device. The extendable material is coupled to either end of the strip of flexible material so as to form a loop. The loop's circumference may be temporarily increased by expanding the extendable material, causing the ends of the flexible material to move away from one another. This capability allows the collar to expand so the animal can slide out of the collar when it is inadvertently coupled to a fixed object in an unsupervised scenario. The first and second coupling devices are fixably coupled to the ends of the strip of flexible material, respectively. Therefore, when the extendable material is expanded, the first and second coupling device move away from one another. The expanding capability may be disabled by rigidly coupling a device simultaneously to the first and second couplers, thereby preventing them from moving away from one another. Therefore, the expandable safety feature may be disabled when an animal is in a supervised scenario such as a walk. Also, while embodiments of the present invention are directed at an animal safety collar and methods of operation, it will be appreciated that the teachings of the present invention are applicable to other areas.

The following terms are defined as follows:

Strip of flexible material—an elongated portion of material in which the length is longer than the height and that is composed of a material that may be curved and/or flexed in at least one orientation. A strip of flexible material may include but not be limited to a piece of nylon, leather, rope, string, plastic, metal, etc.

Internally coupled—a coupling between a first and second object in which the first object is coupled to an internal region of the second object so as to hide the coupled portion of the first object.

Figure 1:
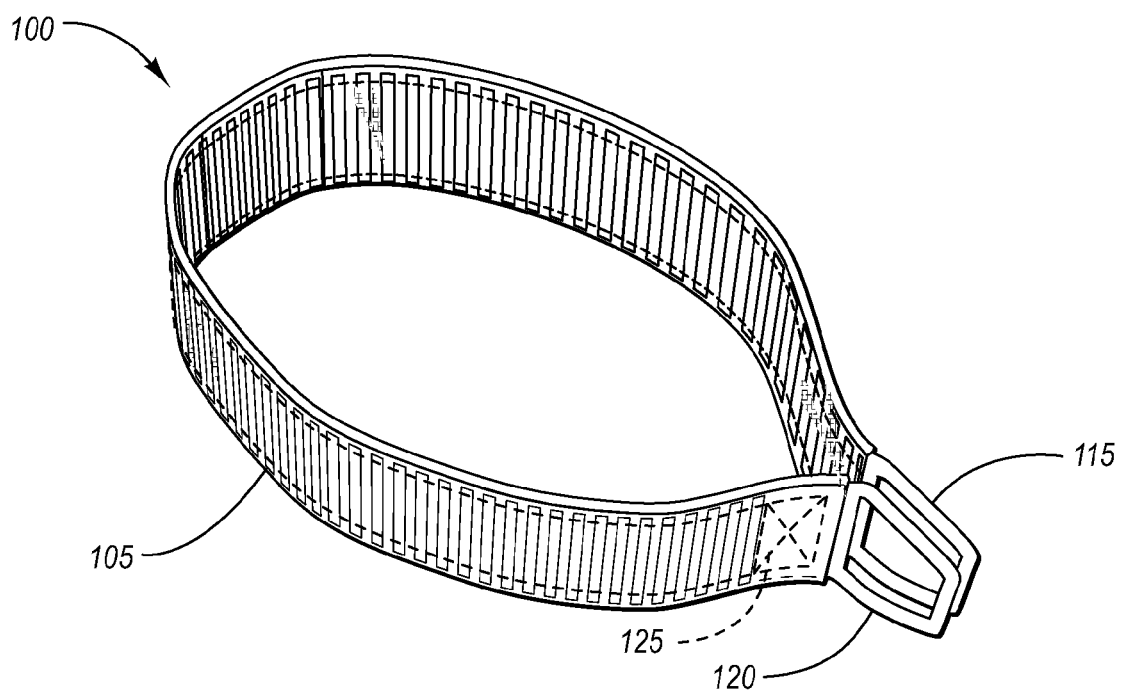
FIG. 1 illustrates a perspective view of a safety collar in accordance with one embodiment of the present invention, wherein the collar is illustrated in a compressed configuration.
Figure 2:
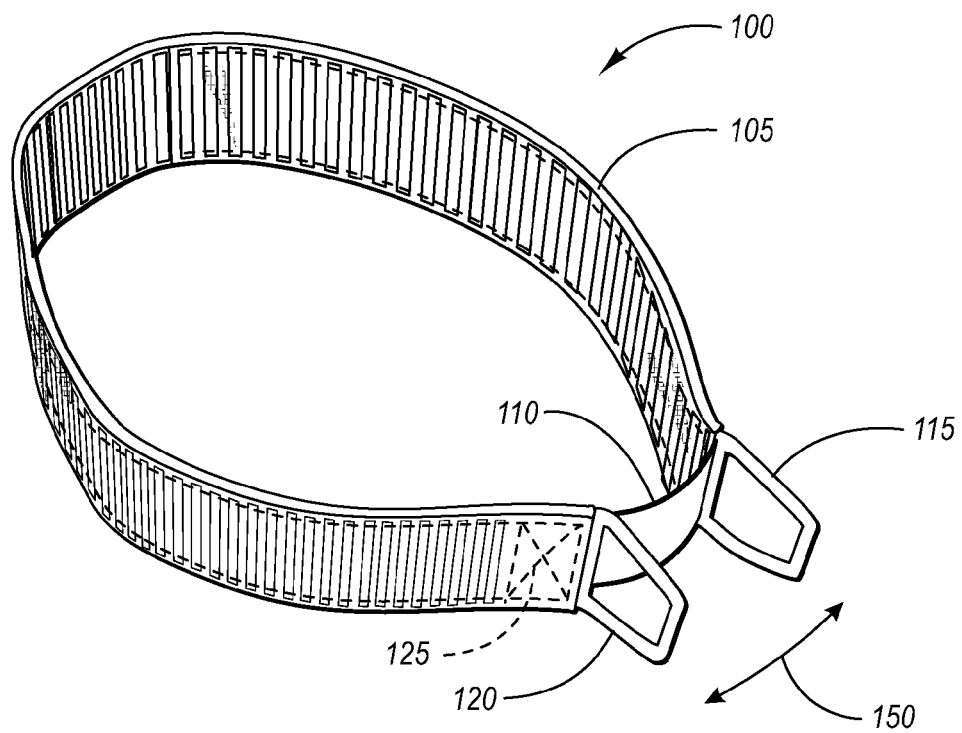
FIG. 2 illustrates a perspective view of the safety collar illustrated in FIG. 1 shown in an expanded configuration.

Reference is initially made to FIGS. 1-2, which illustrate perspective views of a safety collar in accordance with one embodiment of the present invention, wherein the collar is illustrated in a compressed and expanded configuration respectively, and designated generally at 100. The collar 100 includes a strip of flexible material 105, an extendable material 110, a first coupling device 115, and a second coupling device 120. The illustrated strip of flexible material 105 includes a nylon material with a specific durable stitching pattern. The strip of flexible material 105 may be bent or flexed so as to change the shape, but it cannot be substantially stretched. Therefore, the strip of flexible material 105 may bend to adjust to an oval or non-linear shape rather than a circle. Various other materials and dimensions may be used and yet remain consistent with the present invention. The strip of flexible material 105 may further include an information/identification system such as a tag. The illustrated strip of flexible material 105 is internally coupled to the extendable material 110, the first coupling device 115, and the second coupling device 120. This internal coupling includes disposing a portion of the extendable material 110, first coupling device 115, and second coupling device 120 within an internal hollow region of the strip of flexible material 105. The illustrated strip of flexible material includes an internal lengthwise cavity. The internal coupling includes a stitch 125 that extends through the strip of flexible material, the extendable material 110, the first coupling device 115, and the second coupling device 120. Various other stitching patterns or internal coupling systems may also be practiced in accordance with the present invention.

The extendable material 110 is disposed between the ends of the strip of flexible material 105 as shown in FIG. 2. The extendable material 110 is configured to be both flexible and expandable. Therefore, the extendable material 110 may bend to change shape and expand to change length. In addition, the extendable material 110 is biased to a particular default length that substantially positions the first and second coupling device 115, 120 adjacent to one another as illustrated in FIG. 1. However, the extendable material 110 may be expanded in response to an expansion force 150 as illustrated in FIG. 2. When the extendable material 110 is expanded, the ends of the strip of flexible material 105 and the coupling devices 115, 120 are separated away from one another. Various other forces may be translated into an expansion force to expand the extendable material 110, as discussed in reference to FIGS. 3A-C. FIG. 1 illustrates the collar 100 in a compressed configuration, and FIG. 2 illustrates the collar 100 in an expanded configuration.

The illustrated first and second coupling devices 115, 120 are positioned on the ends of the strip of flexible material and configured to extend in a substantially perpendicular orientation. The first and second coupling devices 115, 120 are composed of a substantially rigid material such as plastic or a plastic composite. The coupling devices 115, 120 are shaped to receive an external coupling device that extends through both coupling devices 115, 120 so as to disable or override the expansion capability of the extendable material 110. Since the coupling devices 115, 120 are composed of a substantially rigid material and are coupled to the ends of the strip of flexible material 105, a rigid external coupler that couples to both the first and second coupling devices 115, 120 will prevent or impede the coupling devices 115, 120 from separating away from one another, thereby disabling the expansion capability. The disabling of the expansion feature will be discussed in more detail with reference to FIG. 4.

Figure 3A:
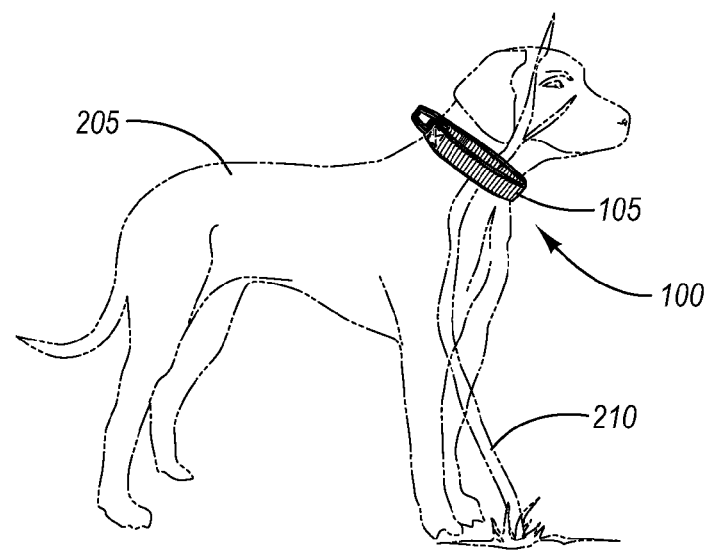
FIG. 3A-C illustrates a sequence of operation in accordance with a second embodiment of the present invention in which the collar expands to allow the animal to escape in an unsupervised scenario.
Figure 3B:
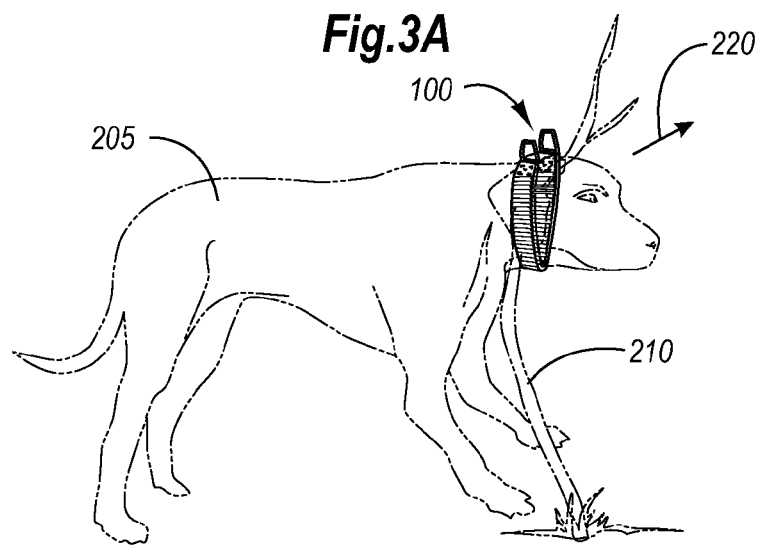
Figure 3C:
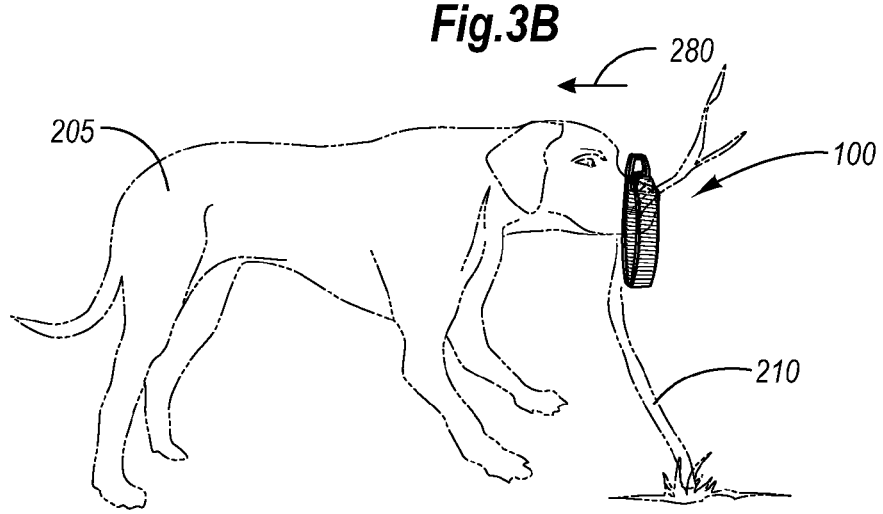

Reference is next made to FIGS. 3A-C, which illustrates a sequence of operation in accordance with a second embodiment of the present invention, in which the collar expands to allow the animal to escape in an unsupervised scenario. A collar 100 in accordance with the present invention is disposed on a dog 205. The dog 205 is shown inadvertently coupled via the collar to a tree branch 210, as illustrated in FIG. 3A. Because of the positioning of the collar 100 on the dog's neck, there is a risk of harm or trauma if the dog 205 remains coupled to the tree branch 210. The dog's 205 natural instinct is to pull away from the tree branch 210, as represented by force arrow 220. By exerting an outward force 220 away from the fixed tree branch 210, an expansion force is exerted upon the collar 100, thereby causing the extendable material to expand apart. By expanding the extendable material, the overall loop length of the collar 100 is expanded. The expanded loop length and dimension of the collar 100 is sufficient to allow the dog 205 to safely pull out of the collar 100 as illustrated in FIG. 3C. It should be noted that the pulling out of the collar 100 is a natural reaction of the dog 205 and does not require training. The dog 205 has then released itself from the collar 100 and avoided harm and trauma. Various other inadvertent coupling scenarios may also be overcome with a similar process. Likewise, other animals will execute a similar process to release themselves from a collar under similar circumstances.

Figure 4:
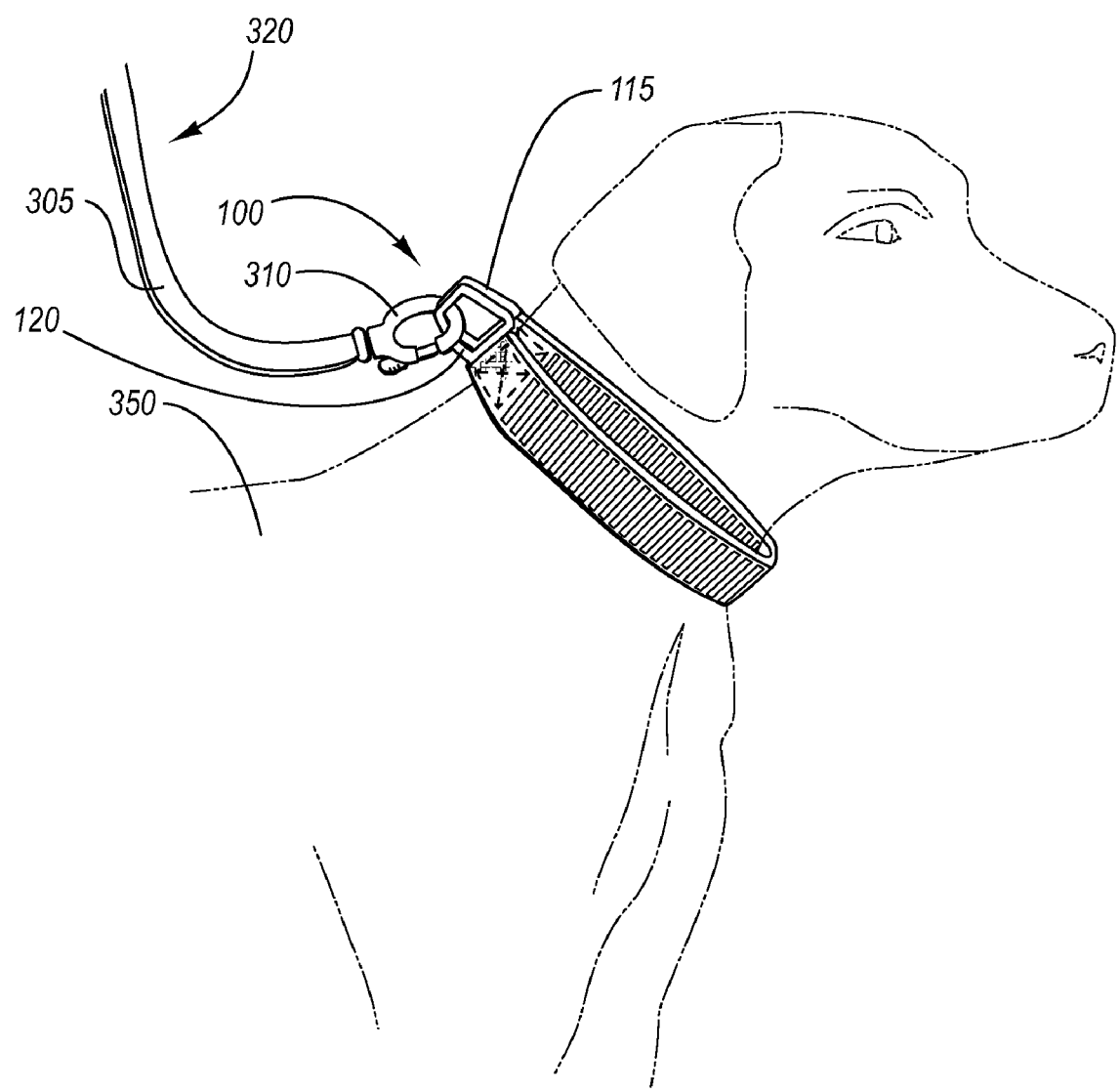
FIG. 4 illustrates a method of operation in accordance with a third embodiment of the present invention in which the expandable features of a collar are disabled to constrain the animal in a supervised scenario.

Reference is next made to FIG. 4, which illustrates a method of operation in accordance with a third embodiment of the present invention, in which the expandable features of a collar are disabled to constrain the animal in a supervised scenario, designated generally at 300. A collar 100 in accordance with the present invention is positioned on a dog's 350 neck. An external rigid coupler 320 is routed through both the first and second coupling devices 115, 120. The illustrated external rigid coupler 320 is a leash which further includes a clasp 310 and a strap 305. The clasp 310 rigidly extends through both the first and second coupling devices 115, 120 effectively restricting the coupling devices 115, 120 from substantially moving away from one another. Since the coupling devices 115, 120 are prevented from moving away from one another and are rigidly coupled to the ends of the strip of flexible material 105, the collar 100 is thus prevented from expanding. For example, if the dog 350 pulls away from the clasp 310 in any direction, the collar 100 will not expand because the first and second coupling devices 115, 120 are prevented from moving away from one another. Therefore, a user can disable the expansion capability of the collar in a supervised scenario such as a walk so as to prevent the dog 350 from slipping out of the collar 100. The external coupling device 320 may later be removed in an unsupervised scenario to protect the dog 350 from harm or trauma due to inadvertently coupling the collar 100 to a fixed object, as previously discussed above with references to FIGS. 3A-C.

Various other embodiments have been contemplated, including combinations in whole or in part of the embodiments described above.

What is claimed is:

1. An animal safety collar comprising:
    a strip of flexible material having a first and second end;
    an extendable material coupled to the first and second end so as to form a loop, and wherein the loop's circumference may be temporarily increased as the extendable material is extended;
    a first coupling device coupled to the first end; and
    a second coupling device coupled to the second end.

2. The animal safety collar of claim 1, wherein the extendable material is directly coupled to the first and second end of the strip of flexible material.

3. The animal safety collar of claim 1, wherein the extendable material is an elastic material biased in a compressed configuration.

4. The animal safety collar of claim 3, wherein the compressed configuration includes positioning the first and second end within one inch of one another.

5. The animal safety collar of claim 1, wherein the extendable material is substantially housed within the strip of flexible material.

6. The animal safety collar of claim 1, wherein the extendable material is internally coupled to the strip of flexible material so as to conceal the extendable material in a compressed configuration.

7. The animal safety collar of claim 1, wherein the first and second coupling devices are rigid loops oriented substantially perpendicular to the first and second end.

8. The animal safety collar of claim 1, wherein the first and second coupling devices each include an external coupler portion and a collar coupler portion, and wherein the collar coupler portions are internally coupled to the first and second end of the strip of flexible material so as to only expose external coupler portions.

9. The animal safety collar of claim 1 further including a system for providing visual information about an animal.

10. The animal safety collar of claim 1, wherein the extendable material is coupled to the first end with the same coupling system as that which couples the first coupling device to the first end.

11. A method for disabling a safety mechanism on an animal collar comprising the acts of:
    providing an expandable animal collar;
    positioning two coupling members on a rigid portion of the expandable collar; and
    rigidly coupling an external coupling device to both of the two coupling members so as to prevent the two coupling members from substantially moving away from one another.

12. The method of claim 11, wherein the act of positioning two coupling members on a rigid portion of the expandable collar includes positioning the two coupling members on opposite ends of the rigid portion.

13. The method of claim 11, wherein the act of rigidly coupling an external coupling device to both of the two coupling members further includes looping a rigid portion of a leash through the two coupling members such that the distance between the two coupling members is prevented from expanding thereby disabling the expandable capability of the expandable animal collar.

14. A method for safely expanding a collar disposed on an animal's neck comprising the acts of:
    providing a collar positioned around an animal's neck;
    coupling the collar to a fixed object as a result of the animal's independent actions;
    receiving a force directed away from the fixed object, wherein the force originated from the animal; and
    expanding the collar in response to the animal exerting the force directed away from the fixed object.

15. The method of claim 14, wherein the act of coupling the collar to a fixed object as a result of the animal's independent actions includes inadvertently hooking the collar on an object while the animal is moving.

16. The method of claim 14, wherein the act of receiving a force directed away from the fixed object includes the animal pulling away from the fixed object thereby causing a force directed away from the fixed object to be placed upon the collar.

17. The method of claim 14, wherein the act of expanding the collar in response to the animal exerting the force directed away from the fixed object includes increasing the diameter of the collar to a size large enough to enable the animal to slip out.

18. The method of claim 14, further including the act of allowing the animal to slide out of the collar.

19. The method of claim 14, wherein the act of expanding the collar in response to the animal exerting the force directed away from the fixed object includes elastically expanding an expandable material.

20. The method of claim 14, wherein the act of expanding the collar in response to the animal exerting the force directed away from the fixed object includes moving a first and second end of a flexible material away from one another.

* * * * *